W. REDICK.
Grain Drill.
No. 11,617.    Patented Aug. 29, 1854.
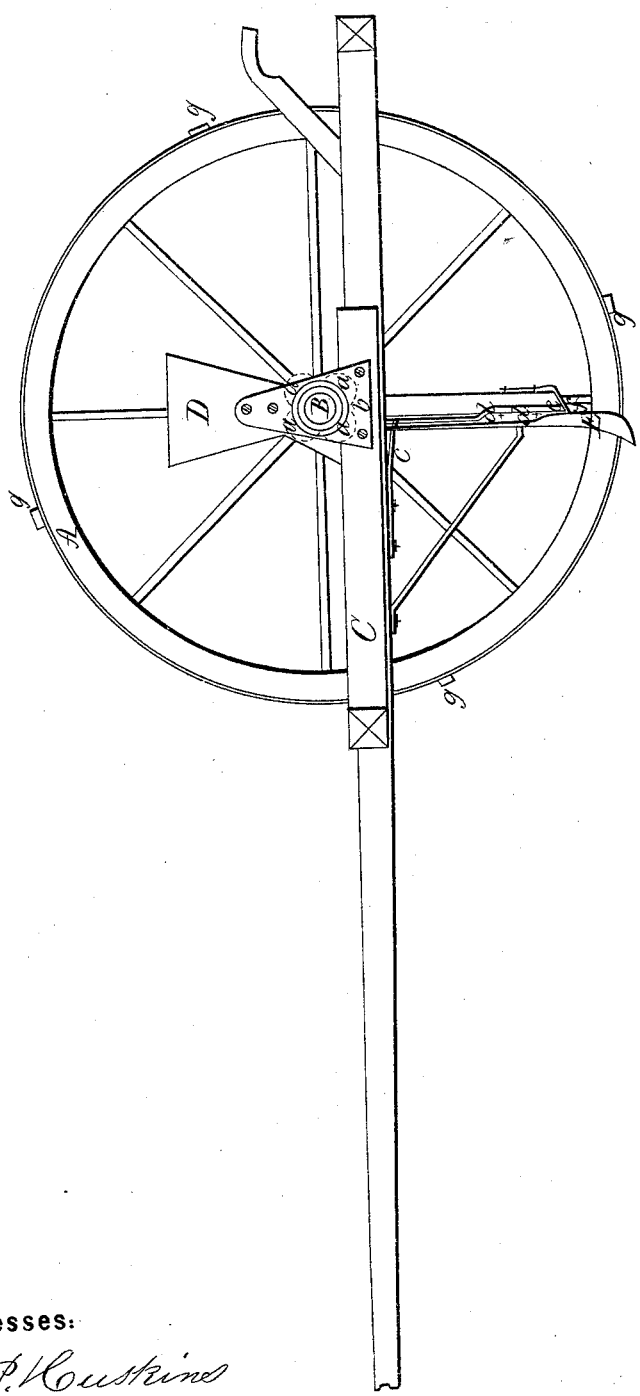
Witnesses:
John P. Huskins
John C. Redick
Inventor:
Wm. Redick

UNITED STATES PATENT OFFICE.

WILLIAM REDICK, OF UNIONTOWN, PENNSYLVANIA.

IMPROVEMENT IN SEED-PLANTERS.

Specification forming part of Letters Patent No. 11,617, dated August 29, 1854.

*To all whom it may concern:*

Be it known that I, WILLIAM REDICK, of Uniontown, in the county of Fayette and State of Pennsylvania, have invented certain new and useful Improvements in Corn-Planters; and I do hereby declare the following to be a full, clear, and exact description of the same, reference being had to the accompanying drawing, making part thereof, and which represents a side elevation of the entire machine.

The nature of my invention consists in the special manner in which I have arranged the cams on the axle, the markers on the periphery of the carrying-wheel, and the valves at or near the bottoms of the seeding-tubes with their several operative parts for the purpose of causing regularity in the marking and dropping of the seed, however irregular the motion or speed of the machine may be.

I am aware that the devices which I use have been used separately on seeding-machines; but they have never produced the result that I achieve by their combined use, and it was only by watching the defects of their separate results that I was able to unite them so as to produce a practically-operating machine, that would lay off the ground and drop the seed at the marks previously made without being varied by the unequal speed of the horse drawing the machine; and I would state in this connection that I do not lay any claim to the separate devices which I use in my machine, as I have only invented the special means of so arranging them as a whole as to greatly simplify and cheapen this class of machines and cure the defects of other machines where these devices have been separately used and imperfect results only attained by their separate use.

To enable others skilled in the art to make and use my machine, I will proceed to describe the same with reference to the drawing.

A is the carrying-wheel upon which the machine is supported and drawn over the ground to be planted.

B is the axle, fast to the wheel, so as to move with it. This axle extends out each side of the wheel a suitable distance, and is provided with cells at regular intervals, which receive from the hopper and carry to the seeding-tubes the grains to be planted. These cells are provided with screws, the heads of which should fit the cells, so that by the running in or out of these screws the depth of the cell will be increased or diminished, so as to carry around only the regulated quantity of grains to be planted. In planting "check-rows" each alternate screw is raised to the periphery of the axle, so as to pass through the hopper without receiving any grains therefrom. When "drilling," all the screws are sunk, so that every cell shall carry out its quota, and in this case the valves in the tubes are hooked in the second or lower hole, so as to remain all the time open.

C represents one of the shafts. They are curved near enough together at their points to suit the working of the horse, while at the axle where the teeth or shoes are arranged, their width may conform to the distance between the rows of corn.

D is the seed-box, there being one on each side of the wheel or on each end of the axle, said hopper diminishing in width from top to bottom, where it is open to allow the grains to drop into the cells.

E is a tooth or shovel, there being one in advance of each seeding-tube for opening up a furrow into which the corn is dropped, the earth falling in over it when the machine passes, as in ordinary drilling operations. The bottoms or lower ends of the tubes fit in behind these teeth, so as to protect them from accident by striking against any obstructions or from filling with dirt.

*a a a a* are four cams arranged around the axle B.

*b* is a rod, having its lower end attached to the valve *d*, and its upper end pressed up against the cams by a spring, *e*, so that said spring and rod open and close said valve at every depression and swell of the four or quadruple cam.

*f* is an inclined bottom on the tubes, made of spring-steel, so as to yield should a grain be caught in the valve and allow it to be thrown out when the valve again opens. The cams are so arranged in relation to the cells that when the opening *e* is closed the contents of the cells are received into the bottom of the tube, and when this quantity of grain is to be dropped into the furrow the valve opens and closes before another discharge from the cells takes place. The markers *g g g g*, of which there are four on the periphery of the wheel A, must bear such relative position to the cams as that they shall arrive at the exact point where the seeds are to be deposited, after making due allowance for the time that the seed occupies in falling from the hopper or cylinder to the valve.

I found in practice that when the seed dropped from the hopper to the ground the variable speed of the horse caused irregular planting and marking, because the markers had a varied velocity, while the seeds had an unchanged one, and the markers were therefore not an exact register, the variable distance amounting to several inches; but by my arrangement of the cams, valves, and markers I have brought the machine practically to perfection in this particular, as the distance that the grains by my plan have to fall allows the markers to come to the precise point.

Should the markers vary the least from the exact point, either in overreaching or falling short of it, the operator by the handles can raise up or draw back the machine so as to bring it right.

I am aware that in the patent of A. B. Earle, granted 17th October, 1848, the valves are placed near the bottom of seed-tube, or rather that his hopper projects down near to the ground and that he uses a bell-signal to indicate the opening of the valve; but in this machine he only accomplishes a part of my results. He uses no markers by which the seed are deposited in their proper places. His machine may plant irregularly and there is nothing to indicate it, while with mine this irregularity will be immediately perceived and its extent marked, so as to correct it. My invention is therefore an improvement upon his, because it does more than his does.

Having thus fully described the nature of my invention, I wish it to be distinctly understood that I do not claim any of the devices herein described when used separately or in any combinations of them other than herein represented; but

What I do claim as of my invention, and desire to secure by Letters Patent, is—

The specific arrangement of the cams on the axle, the markers on the periphery of the carrying-wheel, and the valves at or near the bottoms of the seeding-tubes, with their several operative parts, for the purpose of causing regularity in the marking and dropping of the grain regardless of the varied speed of the horses drawing the machine, as set forth.

WM. REDICK.

Witnesses:
A. B. STOUGHTON,
THOS. H. UPPERMAN.